United States Patent
Röbke

(10) Patent No.: US 8,504,625 B2
(45) Date of Patent: Aug. 6, 2013

(54) METHOD FOR TRANSMITTING MESSAGES USING THE MULTIMEDIA MESSAGE SERVICE (MMS)

(75) Inventor: Matthias Röbke, Cologne (DE)

(73) Assignee: T-Mobile International AG, Bonn (DE)

( * ) Notice: Subject to any disclaimer, the term of this patent is extended or adjusted under 35 U.S.C. 154(b) by 317 days.

(21) Appl. No.: 12/681,486

(22) PCT Filed: Sep. 27, 2008

(86) PCT No.: PCT/EP2008/008241
§ 371 (c)(1),
(2), (4) Date: Jul. 19, 2010

(87) PCT Pub. No.: WO2009/046893
PCT Pub. Date: Apr. 16, 2009

(65) Prior Publication Data
US 2010/0281120 A1 Nov. 4, 2010

(30) Foreign Application Priority Data
Oct. 2, 2007 (DE) .......................... 10 2007 047 281

(51) Int. Cl.
*G06F 15/16* (2006.01)
(52) U.S. Cl.
USPC ........................................ 709/206; 455/412.1
(58) Field of Classification Search
USPC ................. 709/206; 455/412.1, 412.2, 414.1, 455/414.4
See application file for complete search history.

(56) References Cited

U.S. PATENT DOCUMENTS

| | | | | |
|---|---|---|---|---|
| 7,069,301 B2 * | 6/2006 | Jerbi et al. | ..................... | 709/206 |
| 7,274,926 B1 * | 9/2007 | Laumen et al. | ............ | 455/414.1 |
| 8,037,206 B2 * | 10/2011 | Kit Tam et al. | ................ | 709/246 |
| 2003/0064706 A1 * | 4/2003 | Ala-Luukko et al. | ......... | 455/412 |
| 2003/0187930 A1 * | 10/2003 | Ghaffar et al. | ................ | 709/205 |
| 2005/0108334 A1 * | 5/2005 | Tam et al. | ..................... | 709/206 |

(Continued)

FOREIGN PATENT DOCUMENTS

| | | |
|---|---|---|
| DE | 103 14 915 A1 | 11/2004 |
| DE | 10 2004 037 338 A1 | 2/2006 |
| WO | WO 2004066648 A1 * | 8/2004 |
| WO | 2005/099198 A1 | 10/2005 |

OTHER PUBLICATIONS

Search report dated Sep. 3, 2008 from German Patent and Trademark Office in Appln DE 10 2007 047 281.3.

(Continued)

*Primary Examiner* — Wing F Chan
*Assistant Examiner* — Kostas Katsikis
(74) *Attorney, Agent, or Firm* — Browdy and Neimark, PLLC

(57) ABSTRACT

The invention relates to a method for transmitting messages from a user application of a subscriber to a user application of another subscriber with the aid of the Multimedia Messaging Service MMS, the message being in the format of an external application and is identified as such by an application identifier that is transmitted along with the message. According to the invention, the multimedia message service is used by the external application as a transport system for transmitting the message. The message is identified by a network element of the Multimedia Messaging Service using the application identifier and is transmitted in an unmodified state via the Multimedia Messaging Service and forwarded to the external application. The invention also relates to a subscriber terminal and a communication system for carrying out said method.

7 Claims, 1 Drawing Sheet

U.S. PATENT DOCUMENTS

| | | | |
|---|---|---|---|
| 2005/0136886 A1* | 6/2005 | Aarnio et al. | 455/404.2 |
| 2005/0190269 A1* | 9/2005 | Grignani | 348/211.2 |
| 2006/0031297 A1* | 2/2006 | Zuidema | 709/206 |
| 2006/0053227 A1 | 3/2006 | Ye et al. | |
| 2006/0248154 A1* | 11/2006 | Chu et al. | 709/206 |
| 2007/0083601 A1* | 4/2007 | Kim | 709/206 |
| 2007/0100951 A1* | 5/2007 | Bae | 709/206 |
| 2007/0156817 A1 | 7/2007 | Daffner et al. | |
| 2007/0174401 A1* | 7/2007 | Chu et al. | 709/206 |
| 2008/0261591 A1 | 10/2008 | Laumen et al. | |
| 2009/0264104 A1* | 10/2009 | Lee et al. | 455/412.1 |

OTHER PUBLICATIONS

International Search Report dated Mar. 5, 2009 in PCT/EP2008/008241 (WO/2009/046893).

"3rd Generation Partnership Project: Technical Specification Group Core Network and Terminals; Multimedia Messaging Service (MMS); Functional description; Stage 2 (Release 6)", 3GPP TS 23.140 v6.14.0, Chapter 7.1.18, S55-56 (Sep. 2006).

"3rd Generation Partnership Project: Digital cellular telecommunications system (Phase 2+); Universal Mobile Telecommunications System (UMTs); Multimedia Messaging Service (MMS), Functional description; Stage 2 (Release 6)" 3GGP TS 23.140 v6.14.0, European Telecommunications Standards Institute (ETSI) TS 123 140, (Sep. 2006).

English Translation of the Japanese Office Action mailed Jun. 12, 2012 for JP Patent Application No. 2010-527358.

* cited by examiner

METHOD FOR TRANSMITTING MESSAGES USING THE MULTIMEDIA MESSAGE SERVICE (MMS)

FIELD OF THE INVENTION

The invention relates to a method for transmitting messages using the multimedia message service (MMS), in particular to a method for realizing a mobile e-mail service on the basis of MMS.

PRIOR ART

In mobile telecommunications technology it is possible to transmit data of different types, such as, for example, images, sound, video, etc., by means of a mobile communications network with the aid of multimedia message services (MMS). The term "data" is understood to include every type of information put together from individual components or elements. In this case, these individual components or elements can be constructed, organized and/or coded in accordance with different standards. Accordingly, in this sense data which are comprised of various elements in accordance with different standards, can also constitute a multimedia message. The technology representing the basis for this is described in publications of 3GPP TS 22.140 v6.10.0 "Multimedia Message Service (MMS); Stage 1" and 3GPP TS. 23.140 v6.10.0 "Multimedia Message Service (MMS); Functional Description; Stage 2", as well as in the corresponding publications of the Open Mobile Alliance.

As a rule, present-day multimedia messaging systems comprise an MMS relay/server as a central element, connected and communicating with other "partner" MMS relay/servers, e-mail servers, network elements of mobile radio (for example HLR), etc., via a multitude of interfaces. A transmission of the contents of e-mail messages via MMS is possible. For forwarding to an MMS client, or MMS user agent, e-mail messages received by the MMS system are converted into an MMS-aided protocol format and vice versa. However, in many cases this conversion is not desirable.

Furthermore, the use of an application identifier is described in the 3GPP publications and Open Mobile Alliance, which makes it possible to access applications on the mobile terminal in a dedicated manner.

DISCLOSURE OF THE INVENTION

The object of the instant invention is based on disclosing a method, a user terminal and a communications system, which permit the transmission of messages to external applications via the Multimedia Message System.

In accordance with the invention, this object is attained by means of a method for transmitting messages with the aid of the multimedia message service MMS from a user application of a subscriber to a user application of another subscriber, wherein the message is present in a format of an external application and is identified as such by an application identifier, which is transmitted together with the message, wherein the multimedia message service is used by the external application as a transport system for transmitting the message in that the message is identified as such by a network element of the multimedia message service and is passed on via the multimedia message service without change by means of an MMS message to the external application, characterized in that an e-mail message, classified by the application identifier, is transmitted via the multimedia message service to the network element of the multimedia message service, is recognized there by means of the application identifier as a message in the format of an external application and is not treated as a generic MMS message, but is transmitted to an e-mail application server and further to an addressed recipient, a user terminal for transmitting and/or receiving messages with the aid of the multimedia message service, which is comprised of an MMS user application and an external application and is designed for executing the method above, and a communications system for transmitting messages from a user application of a subscriber with the aid of the multimedia message service MMS to a user application of another subscriber, which system is comprised of at least one network element operating in accordance with the method above, and includes at least one user terminal device, which operates in accordance with the user terminal.

Preferred and advantageous embodiments of the invention are recited in the dependent claims.

The method in accordance with the invention for transmitting messages from a user terminal of a subscriber by using the Multimedia Message System MMS to a user terminal of another subscriber is distinguished in that the message is present in a protocol format of an external application and is marked as such by a user identification, which is transmitted together with the message. The Multimedia Message System is used by the external application as a transport system for transmitting the message in that by means of the user identification the message is identified as such by a network element of the Multimedia Message System and is transmitted unchanged via the Multimedia Message System and is passed on to the external application.

In accordance with the invention, the mechanism of a user identification is employed in order to classify messages in the format of an external application, preferably e-mail being transmitted with the aid of the multimedia service, as such. In this way it is possible to differentiate between e-mail and generic multimedia messages and to handle them accordingly.

It is basic for the invention that, as described in the 3GPP standard and the Open Mobile Alliance, an individual application identifier is assigned to the e-mail. Then, in accordance with the invention, this application identifier is used for communication between the MMS relay/server and the preferably mobile user terminal, or respectively the terminal-specific e-mail.

If a multimedia message, which is marked as e-mail with the aid of the application identifier, reaches the mobile user terminal, it is not handled as generic MMS, but is forwarded to a separate e-mail client of the user terminal, which takes over further processing for the user.

If a multimedia message with the user identification "e-mail" is transmitted to the MMS relay/server, it will be treated accordingly and forwarded to the addressed e-mail recipient.

In accordance with the invention, the application identifier "e-mail" can be assigned from a mobile user terminal, an MMS service provider acting as e-mail application server (MM7), as well as from an MMS relay/server (if a message is transmitted via the internet (MM3) to the MMS relay/server).

In order to be able to execute the method in accordance with the invention, the user terminal is comprised of an MMS user application, as well as an MMS-external application which, for example, is suitable for recognizing the application identifiers, or respectively to provide the messages with an application identifier.

The communications system for the transmission of messages by means of the multimedia message service MMS from a user application of one subscriber to the user application of another subscriber is comprised of at least one network element operating in accordance with the method of the invention, and of a user terminal as described within the scope of the invention.

In what follows, the invention will be described in greater detail by means of the drawing figures. Further characteristics and advantages of the invention ensue from the drawings and the description thereof.

DESCRIPTION OF A PREFERRED EMBODIMENT OF THE INVENTION

Figure 1:
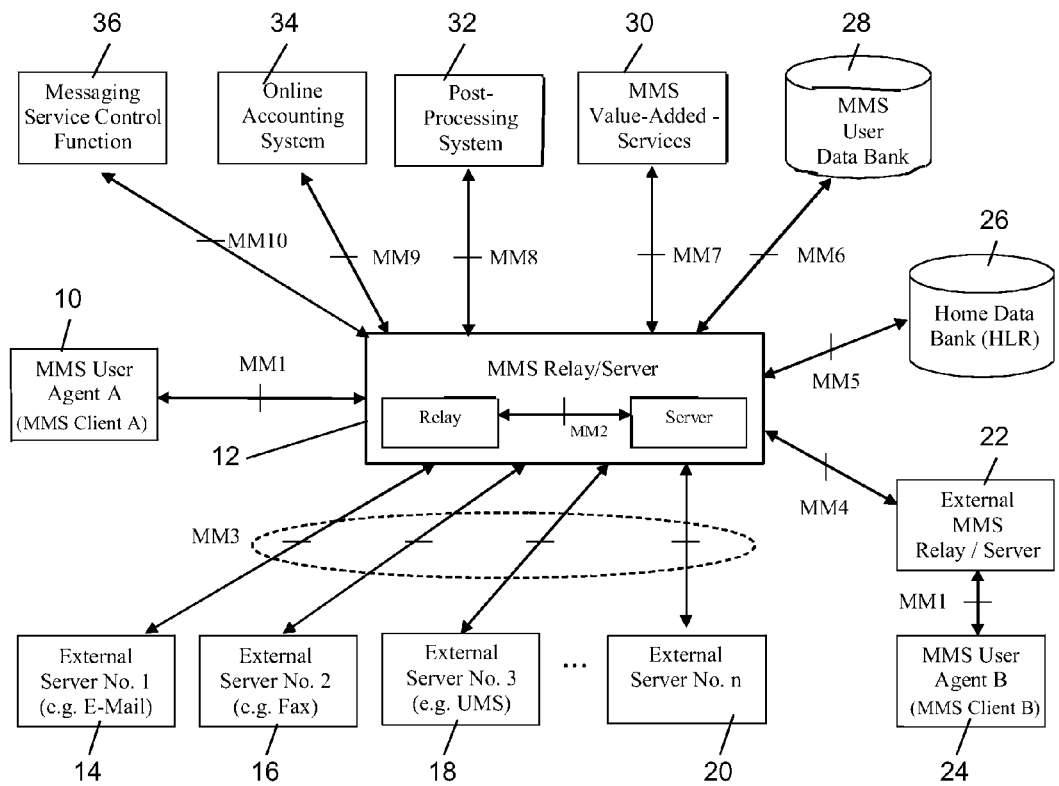
FIG. 1 shows a reference layout of an MMS system.

FIG. 1 shows the basic layout of an MMS system and the interfaces used between the individual elements of the MMS system.

A first interface MM1 is used for transmitting multimedia messages from an MMS user application 10, also called MMS user agent or MMS client, which is provided on a user terminal, to the central unit, the MMS relay/server 12, and vice versa. The MMS user application 10 is a function of an application layer, by means of which the user can compose, view or process multimedia messages. The MMS relay/server is responsible for storing and forwarding incoming and outgoing multimedia messages and for transmitting messages between different communications systems.

The interface MM2 is an internal interface of the MMS relay/server 12.

The interface MM3 is used for the transmission of multimedia messages between the MMS relay/servers 12 and the servers of external communications and message systems, for example an external e-mail server 14, an external fax server 16, an external MMS server 18, or other external servers.

The interface MM4 is used for the transmission of multimedia messages between the MMS relay/servers 12, or respectively 22, of various communications systems. For example, the external MMS relay/server 22 can be responsible for the transmission of messages to a further MMS user application 24.

The interface MM5 is used for communication between the MMS relay/server 12 and a user register, for example the home data bank HLR 26. User data, which are important for the transmission of multimedia messages, are stored in this user home data bank 26.

The interface MM6 is a connection between the MMS relay/server 12 and various MMS user data banks 28.

The interface MM7 is used for the transmission of multimedia messages from the MMS relay/server 12 to MMS added value applications and vice versa. These added value applications or added value services 30 are additional services of the MMS provider or of third parties, for example download services for images, videos or music data sets requiring payment.

The interface MM8 is used for the transmission of connecting data between the MMS relay/server 12 and a post-processing system 32 of the MMS provider.

The interface MM9 is used for the transmission of messages between the MMS relay/server 12 and an on-line accounting system 34.

The interface MM10 is used for the transmission of MMS-specific information between the MMS relay/server 12 and an external message service control function MSCF, i.e. message service control point 36, in which a call number transformation is performed, for example.

In an MMS system it had been possible up to now for an MMS client 10 to receive an e-mail from an external server 14, wherein this e-mail was initially transmitted by the external server 14 to an MMS relay/server 12, was converted there into an MMS-specific format and was then transmitted to the user application 10.

Figure 2:
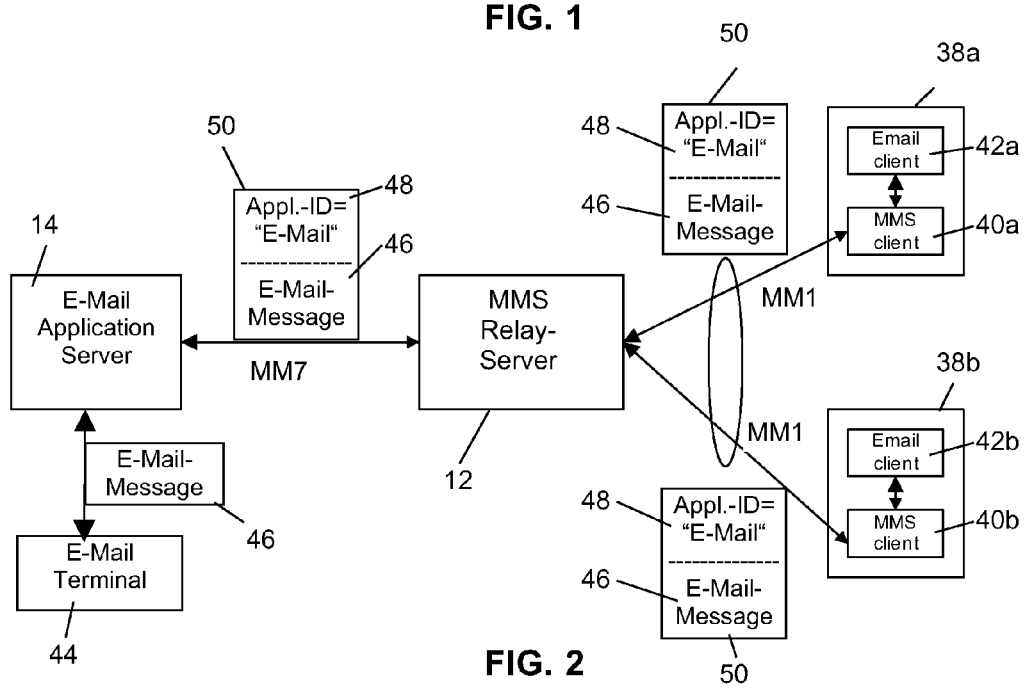
FIG. 2 schematically shows the transmission in accordance with the invention of e-mail from an e-mail application server to user terminals via the MMS system.

FIG. 2 shows an example of the transmission of e-mail by means of the method in accordance with the invention. An external e-mail application server 14 is connected with the MMS relay/server 12 via the MM7 interface. This means that the external e-mail server is tied into the MMS system in the form of an added value application. The MMS relay/server 12 services several MMS users. Every MMS user has user terminal devices 38a, 38b, which are comprised of, for one, an MMS user application 40a, 40b, as well as an e-mail user application 42a and 32b. The MMS user applications 40a, 40b are connected to communicate with the relay/server 12 via the MM1 interface.

It is assumed that an e-mail message 46 is to be transmitted from an e-mail terminal 41 to one or both MMS user terminal devices 38a, 38b. Initially, the e-mail 46 is transmitted via a suitable transmission or transport protocol, for example SMPT, which is used for e-mail, to the e-mail application server 14. There it is determined that the e-mail is intended for MMS user terminal devices. The e-mail is therefore transmitted by the e-mail application server 14 to the MMS relay/server 12. There, in accordance with the invention, its own application identifier 48 is assigned to the e-mail message 46 and the e-mail message 46, identified by the application identifier 48, is packaged in an MMS message 50. Thus, the MMS message 50 is used as a transport container for the e-mail message 46. This specific MMS message 50 containing the e-mail message 46 and the associated application identifier 48 is passed on by the MMS relay/server 12 to the user terminal devices 38a, or respectively 38b. Initially, the specific message 50 is received by the MMS user application 40a, or respectively 40b, of the respective subscriber. By means of the application identifier 48, the MMS user application 40a, or respectively 40b, recognizes that this MMS message 50 is not to be handled as a generic MMS message, but includes an e-mail 46, which must be passed on to an e-mail application. The MMS user application 40a, 40b passes this MMS message 50 on to a respective e-mail user application 42a, 42b, which takes over the further processing of the e-mail message 46 for the user.

The same process applies in the case of an e-mail message sent out from the user terminal devices 38a, 38b. The e-mail message is passed on by the e-mail user application to the MMS user application, is there marked by an application identifier and packaged in an MMS message, which is subsequently transmitted via the MMS system. The MMS message is not handled as such, but is passed on to the addressed e-mail recipient and is processed there by an appropriate e-mail application.

LIST OF REFERENCE NUMERALS

10 MMS user application A
12 MMS relay/server
14 External e-mail server
16 External server
18 External server
20 External server
22 External MMS relay/server 24 MMS user application B
26 Home data bank HLR
28 MMS user data banks
30 MMS added value applications
32 Post-processing system
34 On-line accounting system
36 Messaging service control function
38a, 38b User terminal device
40a, 40b MMS user application
42a, 42b E-mail user application
44 E-mail terminal
46 E-mail message
48 Application identifier
50 MMS message

The invention claimed is:

1. A method for transmitting an e-mail message using the multimedia message service MMS as a transport system for transmitting the e-mail message from a first user application of a first subscriber to a second user application of a second subscriber, comprising:

transmitting said email message, together with an application identifier to identify the first user application, from the first user application of the first subscriber to a network element of the multimedia message service, identifying, by the network element of the multimedia message service, a format of the e-mail message having a format of the first user application by the application identifier, which is transmitted together with the e-mail message, passing the e-mail message, via the multimedia message service without change by means of an MMS message, to the second user application, recognizing the transmitted e-mail message by means of the application identifier as a message in the format of the second user application such that the transmitted e-mail message is not treated as a generic MMS message, and is transmitted to an e-mail application server and further to an addressed recipient.

2. The method in accordance with claim 1, wherein the second user application comprises an e-mail application.

3. The method in accordance with claim 1, wherein the application identifier is stored in a message header of the MMS message.

4. The method in accordance with claim 1, wherein the e-mail message, classified by the application identifier, is transmitted by the e-mail application server to the network element of the multimedia message server, is recognized there as a message in the format of the first user application and is transmitted in the MMS message via the multimedia message service to an e-mail user application of the second subscriber.

5. The method in accordance with claim 1, wherein the e-mail message is transmitted to or from a user terminal device.

6. The method in accordance claim 5, wherein the user terminal device comprises a mobile user terminal device, on which the second user application is installed.

7. A communications system for transmitting messages from a user application of a first terminal device of a first subscriber with the aid of the multimedia message service MMS to a user application of a second terminal device of a second subscriber, which system is comprised of at least one network element, and the first and second user terminal devices, wherein each of the first and second user terminal device comprises an MMS user application as the first user application and an external application as the second user application, the MMS user application and the external application are stored on a non-transitory storage medium in the first and second user terminal devices, respectively, and are configured to run on a processor in the first and second user terminal devices, respectively, and the at least one network element comprises at least one program comprising instructions to perform operations for transmitting an e-mail message using the multimedia message service MMS as a transport system for transmitting the e-mail message from the first user application to the second user application, the operations comprising:

transmitting said email message, together with an application identifier to identify the first user application, from the first user application of the first subscriber to a network element of the multimedia message service, identifying, by the network element of the multimedia message service, a format of the e-mail message having a format of the first user application by the application identifier, which is transmitted together with the e-mail message, passing the e-mail message, via the multimedia message service without change by means of an MMS message, to the second user application, and recognizing the transmitted e-mail message by means of the application identifier as a message in the format of the second user application such that the transmitted e-mail message is not treated as a generic MMS message, and is transmitted to an e-mail application server and further to an addressed recipient.

* * * * *